No. 660,153. Patented Oct. 23, 1900.
O. L. ERVIN.
MOWER.
(Application filed Dec. 23, 1897.)
(No Model.)

Witnesses
J. T. Cross
Chas. T. Brock

Inventor
Oscar L. Ervin,
by O. Marot
Attorneys

THE NORRIS PETERS CO., PHOTO-LITHO., WASHINGTON, D. C.

UNITED STATES PATENT OFFICE.

OSCAR L. ERVIN, OF PLANO, ILLINOIS, ASSIGNOR OF TWO-THIRDS TO E. J. COOK AND D. COOK, OF SAME PLACE.

MOWER.

SPECIFICATION forming part of Letters Patent No. 660,153, dated October 23, 1900.

Application filed December 23, 1897. Serial No. 663,125. (No model.)

*To all whom it may concern:*

Be it known that I, OSCAR L. ERVIN, residing at Plano, in the county of Kendall and State of Illinois, have invented a new and useful Mower, of which the following is a specification.

This invention relates generally to improvements in mowers, and particularly to the class designated as "rotary" mowers.

One object of the invention is to provide a mower which is simple in construction and effective in operation and in which the rotary cutters may be actuated at the expenditure of a smaller amount of power than those now in general use.

A further object is to so construct the cutters that they may be readily removed when desired for the purpose of sharpening or replacing the same by new ones.

In order to enable others skilled in the art to which my invention most nearly appertains to make and use the same, I will now proceed to describe its construction and operation, having reference to the accompanying drawings, forming part of this specification, in which—

Figure 1:
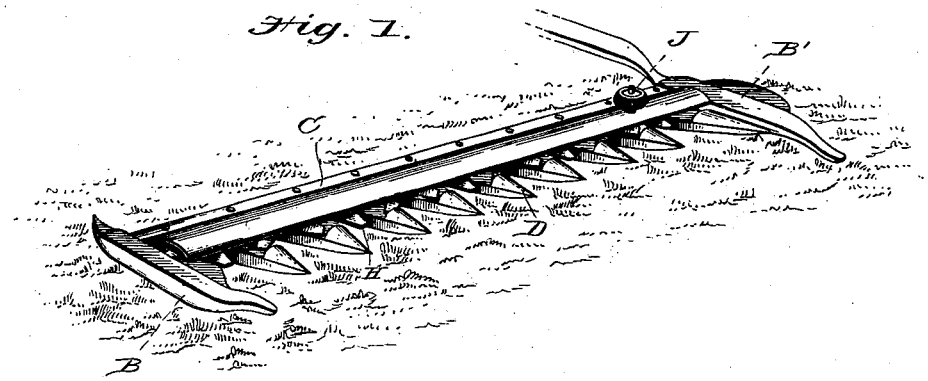
Figure 2:
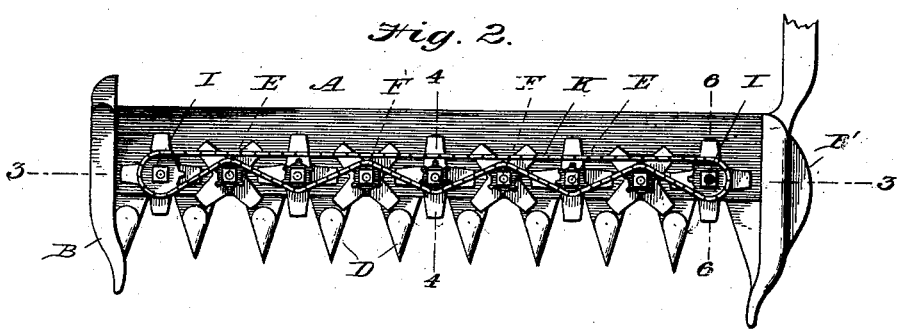
Figure 3:
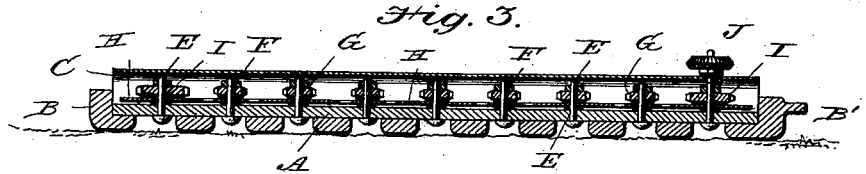
Figure 5:
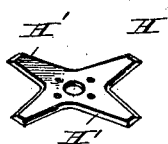
Figure 4:
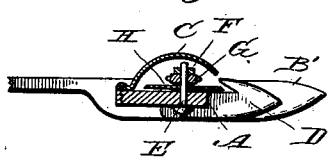
Figure 6:
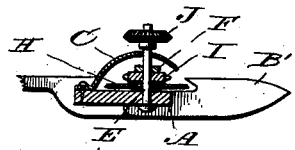

Figure 1 is a perspective view of a finger-bar, showing my improvement. Fig. 2 is a top plan view with the shield removed. Fig. 3 is a longitudinal sectional view on the line 3 3 of Fig. 2. Fig. 4 is a transverse section on the line 4 4 of Fig. 2. Fig. 5 is a perspective view of one of the rotary cutters. Fig. 6 is a transverse section on the line 6 6 of Fig. 2.

In the drawings I have illustrated only the finger-bar with my invention applied thereto and have omitted the mower-frame and the intermediate connections between said frame and the cutters and finger-bar, as the same may be of any desired construction and do not form any part of my invention, which relates to the rotary cutters.

Referring to the drawings, A is the finger-bar, which is supported upon the runners B and B', and D are the fingers, secured to said bar or formed integral therewith, as in the ordinary construction.

C is a sheet-metal shield secured upon the upper surface of the finger-bar and curved over the cutters, so as to protect the operative parts from the falling grass or grain. Projecting upwardly from the finger-bar at points between the fingers are the spindles E, which are headed on their lower ends and screw-threaded at their upper ends to receive the nuts F.

G are sprocket-wheels rotatable upon the spindles and having secured thereto upon their under surfaces the rotary disks H, having a plurality of double-edged cutting-blades H' projecting radially therefrom. The sprocket-wheels I upon the spindles at the respective ends of the finger-bar are larger in diameter than the intermediate sprockets, said sprocket at the inner end of the bar being secured upon its spindle, which is rotatable in the finger-bar and projects through the shield, having upon its end a gear-wheel J, by means of which it is rotated by any desired connection with the motive power of the mowing-machine. A chain K passes around the sprockets at the ends of the finger-bar and engages alternately upon the rear and forward portions of the peripheries of each of the sprocket-wheels G, so that said sprockets are each rotated in a direction opposite to that of the adjacent one. The rotary cutters being held in position upon the spindles by the nuts F, they are readily removed for sharpening or any other purpose.

It will be noticed that the rotary cutters are so placed upon the finger-bar as to mesh with each other, and thus the grain or grass is more effectually cut.

Although I have described my invention as applicable to a large mower, yet it will be understood that the same can be readily applied to a lawn-mower and be equally effective in operation.

While I have illustrated and described the best means now known to me for carrying out my invention, I do not wish it to be understood that I limit myself to the exact construction shown and described, but hold that any slight changes, such as might occur to the ordinary mechanic, will properly fall within the limit and scope of my invention.

Having thus fully described my invention, what I claim as new, and desire to secure by Letters Patent, is—

In a cutter-bar for mowers, the combination, with a bar, of a runner secured to each end thereof, fingers secured to the intermediate portion of the under side of the bar, bolts through the bar, one between each finger, one of which at one end is longer than the others, the heads of the bolts being upon the under side of the bar, a rotary disk upon each bolt above the bar provided with a plurality of radially-arranged double-edged cutting-blades, the blades of the different disks intermeshing with each other, a sprocket-wheel upon each disk, the ones at the ends being larger than the others, a chain on the wheels in position to rotate the alternate wheels in opposite directions, a curved shield secured to the bar at its rear edge to the rear of and extending forwardly over the disks, one end of which is perforated for the passage of the long bolt, and a bevel-wheel on top of said bolt above the shield, substantially as described.

OSCAR L. ERVIN.

Witnesses:
L. E. ERVIN,
E. W. FAXON.